(12) United States Patent
Shmunk (10) Patent No.: US 9,076,216 B2
(45) Date of Patent: Jul. 7, 2015

(54) METHOD OF IMAGE SEGMENTATION

(76) Inventor: Dmitry Valerievich Shmunk, Novosibirsk (RU)

( * ) Notice: Subject to any disclaimer, the term of this patent is extended or adjusted under 35 U.S.C. 154(b) by 0 days.

(21) Appl. No.: 14/238,871

(22) PCT Filed: Jun. 19, 2012

(86) PCT No.: PCT/RU2012/000478
§ 371 (c)(1),
(2), (4) Date: Feb. 14, 2014

(87) PCT Pub. No.: WO2013/025123
PCT Pub. Date: Feb. 21, 2013

(65) Prior Publication Data
US 2014/0254935 A1    Sep. 11, 2014

(30) Foreign Application Priority Data
Aug. 15, 2011   (RU) .................................. 2011134204

(51) Int. Cl.
*G06K 9/34* (2006.01)
*G06T 7/00* (2006.01)
*G06K 9/46* (2006.01)

(52) U.S. Cl.
CPC .............. *G06T 7/0079* (2013.01); *G06K 9/342* (2013.01); *G06T 7/0081* (2013.01); *G06T 2207/20016* (2013.01); *G06K 9/469* (2013.01)

(58) Field of Classification Search
CPC ... G06T 7/0079; G06T 7/0083; G06T 7/0093; G06T 7/0081; G06T 2207/20144; G06T 2207/10016; G06T 5/002; G06K 9/34; G06K 9/38; G06K 9/469
See application file for complete search history.

(56) References Cited

U.S. PATENT DOCUMENTS

| | | | |
|---|---|---|---|
| 5,787,194 A * | 7/1998 | Yair ............................... | 382/173 |
| 6,058,210 A * | 5/2000 | de Queiroz et al. ........... | 382/232 |
| 6,078,688 A * | 6/2000 | Cox et al. ...................... | 382/173 |
| 6,744,923 B1 | 6/2004 | Zabih et al. | |
| 7,349,922 B2 | 3/2008 | Brandt et al. | |
| 7,366,348 B2 | 4/2008 | Watson | |

(Continued)

FOREIGN PATENT DOCUMENTS

RU    2004121993    1/2006

OTHER PUBLICATIONS

Cramariuc et al. International Conference on Digital Signal Processing 1997, 4 Pages, "Clustering Based Region Growing Algorithm for Color Image Segmentation."

(Continued)

*Primary Examiner* — Amir Alavi
(74) *Attorney, Agent, or Firm* — Brooks Kushman P.C.

(57) ABSTRACT

A method of processing of photo and video images is disclosed which searches for a minimum of cost functions carried out at an N-number of image detail levels, from coarser to finer, and at each image detail level the image is divided into regions; each region is assigned a single segmentation value by a η-number of successive iterations. The value of the cost function for the seams at the region boundaries is calculated with different types of image segmentation, and for every region a segmentation value is chosen which minimizes the sum of the cost functions of the seams and data. The technical result is the segmentation of an image with little use of the memory resources of a mobile device while maintaining both resistance to image noise and operating speed.

5 Claims, 6 Drawing Sheets

(56) References Cited

U.S. PATENT DOCUMENTS

| | | | |
|---|---|---|---|
| 2010/0322518 A1 | 12/2010 | Prasad et al. | |
| 2011/0013837 A1 | 1/2011 | Bergman et al. | |
| 2013/0230237 A1* | 9/2013 | Schlosser et al. | 382/164 |
| 2014/0254935 A1* | 9/2014 | Shmunk | 382/173 |
| 2015/0016724 A1* | 1/2015 | Levy | 382/173 |

OTHER PUBLICATIONS

Shafarenko et al. IEEE Transactions on Image Processing Nov. 1997, vol. 6, No. 11, p. 1530-1544, "Automatic Watershed Segmentation of Randomly Textured Color Images."
Barni et al. EUSIPCO 1996, 4 Pages, "A Fuzzy Expert System for Low Level Image Segmentation."
Celenk., IEEE Proceedings of the 29th Southeastern Symposium on System Theory 1997, p. 483-487, "Hierarchical Color Clustering for Segmentation of Textured Images."
Jacob et al. IEEE Transactions on Pattern Analysis and Machine Intelligence Aug. 2004, vol. 26, No. 8, p. 1007-1019, "Design of Steerable Filters for Feature Detection Using Canny-Like Criteria."
Cross et al. IEEE Transactions on Pattern Analysis and Machine Intelligence Jan. 1983, vol. PAMI-5, No. 1, p. 25-39, "Markov Random Field Texture Models."
Geam et al. IEEE Transaction on Pattern Analysis and Machine Intelligence Nov. 1984, vol. PAMI-6, No. 6, p. 721-741, "Stochastic Relaxation, Gibbs Distributions, and the Bayesian Restoration of Images."
Ji et al. IEEE International Conference on Image Processing Oct. 4-7, 1998, vol. 1, p. 80-83, "Image Segmentation of Color Image Based on Region Coherency."
Deng et al. IEEE Computer Society Conference on Computer Vision and Pattern Recognition Jun. 23-25, 1999, vol. 2, p. 446-451, "Color image segmentation."
Kanai., Proc. of the SPIE—The International Society for Optical Engineering—Visual Communications and Image Processing 1998, vol. 3309, p. 709-720, "Image Segmentation using Intensity and Color Information."
Shi et al. IEEE Transactions on Pattern Analysis and Machine Intelligence Aug. 2000, vol. 22, No. 8, p. 888-905, "Normalized Cuts and Image Segmentation."
Chochia., Theory and Methods of Information Processing 2010, vol. 10, No. 1, p. 23-35, English Translation attached to original, All together 30 Pages, "Pyramidal Algorithm for Image Segmentation."
Szeliski et al. IEEE Transactions on Pattern Analysis and Machine Intelligence Jun. 2008, vol. 30, No. 6, p. 1068-1080, "A Comparative Study of Energy Minimization Methods for Markov Random Fields with Smothness-Based Priors."
Vezhnevets., Computer Graphics and Multimedia. Web Journal 2006, vol. 4, Issue No. 4, English Translation attached to original, All together 27 Pages, "Image Segmentation Methods Automatic Segmentation."
International Search Report for PCT/RU2012/000478, English Translation attached to original, Both completed by the Russian Patent Office on Oct. 25, 2012, All together 4 Pages.
Ozmen et al. EUSIPCO 2002, vol. III, p. 263-266, "Edge Detection Using Steerable Filters and CNN."
Tremeau et al. Pattern Recognition 1997, vol. 30, No. 7, p. 1191-1203, "A Region Growing and Merging Algorithm to Color Segmentation."

* cited by examiner

METHOD OF IMAGE SEGMENTATION

CROSS-REFERENCE TO RELATED APPLICATION

This application is the U.S. national phase of PCT Application No. PCT/RU2012/000478 filed on Jun. 19, 2012, which claims priority to RU Patent Application No. 2011134204 filed on Aug. 15, 2011, the disclosures of which are incorporated in their entirety by reference herein.

AREA OF TECHNOLOGY

The invention relates to the area of photographic and video imaging—in particular, with the help of mobile devices with integrated photographic and video cameras—and can be used, for instance, to improve the quality of a resulting image obtained from several input frames.

BACKGROUND OF THE INVENTION

Since the exposition of several input frames (snapshots), as a rule, occurs at different moments in time, there are distortions in forming a scene between various frames that is manifested in the different disposition of moving (unsteady) objects and in the change of conditions of scene lighting (for instance, as a result of changes in cloudiness), which affects the quality of a resulting image and is manifested in:

Double contours of unsteady objects and, in some cases, in doubling the number of moving objects in an image Semi-transparency of unsteady objects Noticeable irregularity in brightness or color balance of various areas of the image Currently, one of the ways for improving the quality of pictures with the help of mobile devices is to shoot several frames in a short period of time, subsequently merging them by stitching several images into a single resulting photograph (creating a panoramic image, an image with enhanced dynamic range, decreasing the level of image noise, etc.). In doing this, stitching should be done in such a way that seams pass through the trajectory of the least differences in neighboring initial images and that they bypass unsteady objects. A widespread method for determining an optimum seam trajectory uses various image segmentation methods [Alexander Vezhnevets, Olga Barinova, "Image Segmentation Methods: Automatic Segmentation", *Computer Graphics and Multimedia*, Issue No. 4(4)/2006: http://cgm.computergraphics.ru/content/view/147].

Image segmentation and stitching is most suitable in the following cases of creating one image out of several initial images:

Creating a panoramic image out of several shots, each of which depicts only part of a panorama Creating an image with a high dynamic range out of several initial low dynamic range pictures There are various methods for improving the quality of images with the use of segmentation.

The clustering method uses a representation of image points that is assigned to a certain feature space, and this feature space introduces metrics (measure of closeness).

The disadvantage of this method consists in the fact that the spatial arrangement of points is either not taken into account at all or is taken indirectly (for instance, using the point's coordinates as one of the features). That is why, usually after clustering the image points, a procedure for defining connected components is performed. Moreover, clustering methods do not work well on noisy images: often separate region points are lost, several small regions are created, and so on.

The method of region growing [A. Tremeau and N. Borel, "A Region Growing and Merging Algorithm to Color Segmentation", *Pattern Recognition*, 1997; Y. Kanai, "Image Segmentation Using Intensity and Color Information", *SPIE—Visual Communications and Image Processing* '98; B. Cramariuc, M. Gabbouj, and J. Astola, "Clustering Based Region Growing Algorithm for Color Image Segmentation", *International Conference on Digital Signal Processing*, 1997; and Y. Deng, B. S. Manjunath, and H. Shin, "Color Image Segmentation", *CVPR* 1999] takes into account the spatial arrangement of points directly. First, according to a certain rule, the regions' centers are selected, and adjacent points which meet a certain criterion are added to them in stages. The region growing process stops when none of the image points can be added to any of the regions. There are different criteria that are used, on the basis of which a point is added or not added to a region: closeness of a point to a region center, closeness to an adjacent point added to a region at the previous step, closeness according to certain region statistics, cost of the shortest path from a point to a region center, etc. For the most part, the region growing process is utilized to cover separate regions. However, following this procedure step by step or simultaneously for several regions, it is possible to obtain partitioning of a whole image.

The disadvantage of this method is its inapplicability to tasks of seam stitching; it is applied only in cases where there is only one reference image. Also, it requires significant memory resources of mobile devices. Moreover, the speed of the data processing is not fast enough.

Fragmentation-merging methods [A. Tremeau and N. Borel, "A Region Growing and Merging Algorithm to Color Segmentation", *Pattern Recognition*, 1997; B. Cramariuc, M. Gabbouj, and J. Astola, "Clustering Based Region Growing Algorithm for Color Image Segmentation", *International Conference on Digital signal Processing*, 1997; M. Celenk, "Hierarchical Color Clustering for Segmentation of Textured Images", *Proceedings of the 29th Southeastern Symposium on System Theory*, 1997]; [S. Ji and H. W. Park, "Image Segmentation of Color Image Based on Region Coherency", *Proceedings of ICIP* '98; L. Shafarenko, M. Petrov, and J. Kittler, "Automatic Watershed Segmentation of Randomly Textured Color Images", *IEEE Transactions on Image Processing*, 1997; and M. Barni, S. Rossi, and A. Mecocci, "A Fuzzy Expert System for Low Level Image Segmentation", *EUSIPCO*-96] consist of two main stages: fragmentation and merging. Fragmentation starts with a partitioning a certain image but not necessarily into uniform regions. The region fragmentation process is carried out until there is a partitioned image which meets the requirement of segment uniformity (over-segmentation). Then the unification of similar adjacent segments occurs until an image partition into uniform regions of maximum size is obtained.

The disadvantages of these methods are the low speed of data processing, the need for increased memory resources, and their use only in the case of a single reference image.

The method of Markov field modeling [G. R. Cross and A. K. Jain, "Markov Random Field Texture Models", *IEEE Transactions on Pattern Analysis and Machine Intelligence*, 1983; S. German and D. German, "Stochastic Relaxation, Gibbs Distributions, and the Bayesian Restoration of Images", *IEEE Transactions on Pattern Analysis and Machine Intelligence*, 1984; R. Szeliski, R. Zabih, D. Scharstein, O. Veksler, V. Kolmogorov, A. Agarwala, M. Tappen, C. Rother, "A Comparative Study of Energy Minimization Methods for Markov Random Fields with Smoothness-based Priors", *IEEE Transactions on Pattern Analysis and Machine Intelligence*, vol. 30, no. 6, June 2008] is based on the assumption that the color of each point of the image depends on the colors of a certain number of adjacent points. A summary of the image model is proposed. It is also possible to make a summary for texture segmentation [Y. Deng, B. S. Manjunath, and H. Shin, "Color Image Segmentation", *CVPR* 1999].

A disadvantage of this method is its difficulty of implementation.

Methods based on edge detection operators [M. Jacob, M. Unser, "Design of Steerable Filters for Feature Detection Using Canny-like Criteria", *IEEE Transactions on Pattern Analysis and Machine Intelligence*, vol. 26, no. 8, pp. 1007-1019; Atilla Ozmen and Emir Tufan Akman, "Edge Detection Using Steerable Filters and CNN", 2002] utilize segmentation which consists in finding region boundaries and is well solved for halftone images. A halftone image is regarded as a function of two variables, and it is presumed that the region boundaries correspond to the maximums of this function's gradient. In order to find them, a differential geometry is used. To increase the resistance against noise, before using filtration an image is usually blurred. Due to the commutativity of Laplace's operator and Gauss's filter, it is possible to perform blurring and boundary finding at the same time.

A disadvantage of this method is a lack of resistance to image noise. Moreover, since the definition of a boundary is different for each task, it is necessary to choose a revision method for filtration results each time that boundary finding methods are applied.

Optimization methods [Y. Deng, B. S. Manjunath, and H, Shin, "Color Image Segmentation", *CVPR* 1999] consist of partitioning an image into uniform regions which becomes an optimization task. For this, the segmentation task is formulated as a task of searching for partitioning of an image which has certain qualities, then a function is introduced which reflects the degree of conformity of the obtained segmentation to the presented requirements. For instance, a segmentation quality function is introduced which uses the distribution of colors on an image.

Disadvantages of these methods are their labor intensiveness and high requirements for the resources of mobile devices.

Common disadvantages of all these methods are:
  inapplicability of an obtained segmentation to the tasks of stitching due to the fact that methods can work only on one reference image (region growing methods, fragmentation-blending, edge detection)
  system resource requirements which are inapplicable for mobile devices—memory and operating speed of a computing unit (clustering methods, region growing, fragmentation-blending, Markov random field, graph theory method, optimization approaches)
  poor operation on noisy images (clustering methods, edge detection)
  absence of consideration of the spatial arrangement of points (clustering).

The graph cut minimization method is the closest to the presented solution [U.S. Pat. No. 6,744,923, "System and Method for Fast Approximate Energy Minimization via Graph Cuts"; and R. Szeliski, R. Zabih, D. Scharstein, O. Veksler, V. Kolmogorov, A. Agarwala, M. Tappen, C. Rother "A Comparative Study of Energy Minimization Methods for Markov Random Fields with Smoothness-based Priors", *IEEE Transactions on Pattern Analysis and Machine Intelligence*, vol. 30, no. 6, June 2008]. An image is presented in the form of a weighted graph with the nodes in the image points. The weight of the graph links reflects the similarity of points (for instance, the distance between the points by a certain metric). Image partitioning is modelled by graph cuts. Graph theory methods introduce the function of the cut "cost" which reflects the quality of obtained segmentation. Thus, the task of image partitioning into uniform regions reduces to the optimization task of finding a minimum-cost graph cut. Apart from color uniformity and segments' texture, this method allows for controlling the form of segments, their size, complexity of boundaries, etc. There are various methods for finding a minimum-cost cut: greedy algorithm (at each stage choosing those links which would make the total cut cost minimal), methods of dynamic programming (guaranteeing the choice at each stage of an optimal link resulting in an optimal path), etc.

A disadvantage of this method is the large number of calculations required in order to obtain a solution which decreases the operating speed as well as the need to provide a large amount of additional memory for finding an optimal cut.

SUMMARY OF THE INVENTION

The author undertook the task of designing an image segmentation method which would meet the following requirements:
  operating speed
  optimal image segmentation—i.e., one which helps attain the global minimum of sum of the seam cost function and the cost function of image data (based on color, brightness, and other parameters)—and proximity of the obtained segmentation to the absolute optimal fragmentation, analogous to the best known methods
  no additional memory resources required of the mobile device
  resistance to image noise.

The essence of the presented technical solution consists in the fact that, in the known image segmentation method which searches for a minimum of cost functions, this search is carried out at an N-number of image detail levels, from coarser to finer, and at each image detail level the image is divided into regions; each region is assigned a single segmentation value by means of an n-number of successive iterations. Thereafter, the value of the cost function for the seams at the region boundaries is calculated with different types of image segmentation, and for every region a segmentation value is chosen which minimizes the sum of the cost functions of the seams and data. In those cases when it is important to exclude influence of seams on segmentation result (e.g. when image orientation—independent segmentation is needed), search for a minimum at each subsequent iteration is conducted by processing image regions which have no common boundaries, and selection of regions for processing is updated at each subsequent iteration. Moreover, to avoid a trap in the search for the global minimum in one of the local minimums created by the high cost of a seam around any local region, several initial iterations at every detail level are executed with a reduced contribution of seam functions in the sum of the cost functions. This allows for the seams to jump (leak) through the peaks of cost.

BRIEF DESCRIPTION OF THE DRAWINGS

—※— —Markov random field method "Iterated Conditional Modes"

—◦— —※— —variants of the graph cut method "Loopy Belief Propagation"

—◆— —analogous to the "Loopy Belief Propagation" method, a method of "Tree-reweighted Message Passing"

—⁘— —prediction of the lower limit of the global minimum

—◆— —▲— —different variants of the "graph cut" method

◎ —the suggested method; the circle marks the full processing time and the obtained deviation from the global minimum.

DETAILED DESCRIPTION OF THE INVENTION

The presented method is carried out in the following manner: a reference image is subjected to an N-number of detail-level operations (random partition into regions that are close in size, for instance). At each detail level, an n-number of iterations is performed as long as there remain changes in the regions segmentation which lead to a decrease in the total value of functions of the seams and data—or until a maximum acceptable number of iterations for a given detail level is reached, which is limited by the total processing time of a mobile device. There are two cost functions in use:

The cost function of the data which indicates how optimal the allotment of a specific image pixel into one of the segments is. For instance, an absolute value of the difference between a numeric value of a pixel's color and a segment's color.

The cost function of a seam indicates how optimal the boundary trajectory of segments is in a given place.

At each detail level, seams can go only along the boundaries of regions. The form of the regions remains unchanged for each of the detail levels. Since the corrective iterations which follow the initial coarse one allow for a jump (leak) through the local minimums of cost functions, and a resulting segmentation is close to the global minimum, this limitation on the trajectory of seams is considered acceptable. Segmentation, obtained through image fragmentation and based only on the value of the cost function of the data, without taking into account the cost of the seams, is used as the initial segmentation. With such segmentation, each region of the image pixels is assigned a segment value which gives a minimal sum for all pixels of a given region. Iterations with the primary (coarse) detail level are performed on the combined values of pixel regions.

Each subsequent iteration finds a more optimal segmentation as compared to the previous one.

At each iteration, each of the pixel regions undergoes the following processes:

the local value of the cost function is calculated, including the cost of the data and seams surrounding a given region;

the cost function is calculated for all possible segmentation values for a given region;

in the event that the initial choice of segmentation for a given region is not optimal (the value of function is higher than for any other segmentation), the value for a given region is replaced with an optimal one (with the minimum value of the cost functions).

Regions are processed one after another; at the same time, the segmentation value in a specific region affects the cost of the seam which passes along the boundary of a given region, leading to the dependence of a resulting segmentation on an order of processed regions. In cases when it is important to exclude the influence of the seams on a segmentation result (e.g. when image orientation—independent segmentation is needed), the search for a minimum at each pass of the iteration is performed by processing the image regions which do not have common boundaries; the choice of regions for processing is changed at each subsequent iteration.

To avoid a trap in the search for the global minimum in one of the local minimums created by the high cost of a seam around any local region as a result of noise in the image, several initial iterations at every detail level are executed with a reduced input of seam functions into the sum of the cost functions. This enables the seams to jump (leak) through the peaks of the cost. Subsequent iterations are executed with the usual input of seam functions.

FIG. 1-FIG. 5 illustrate a specific example of implementation of the presented method, when the reference image is divided into squares, and seams can only pass along square boundaries. Explanations are given for segmentation of a color space of one reference image. During segmentation of several images, only cost functions of the data and seams will change, because, instead of using pixel color values as the function parameters, others will be used which reflect the measure of proximity of various images (for instance, difference of brightness).

At each iteration, each of the squares undergoes the following processes:

the local value of the cost function is calculated, including the cost of the data and seams surrounding a given square;

the cost function is calculated for all possible segmentation values for a given square;

in the event that the initial choice of segmentation for a given square is not optimal (the value of function is higher than for any other segmentation), the value for a given square is replaced with an optimal one (with the minimum value of the cost functions).

Figure 1:
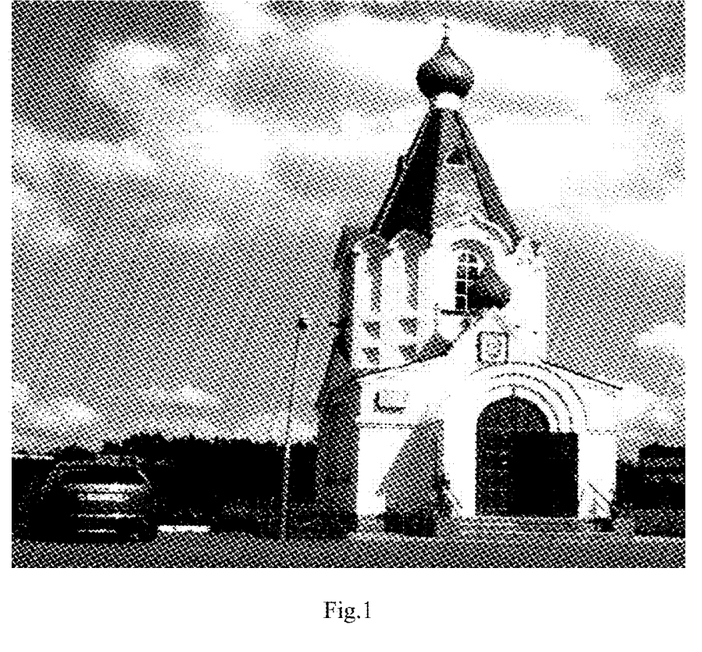
FIG. 1 gives an example of a reference image, the color space of which will be optimally segmented in 12 colors.
Figure 2:
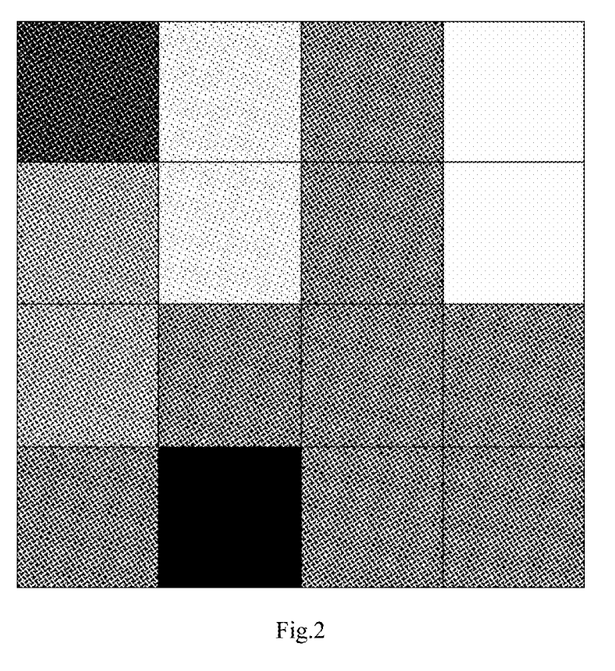
FIG. 2 gives an example of reference segmentation for the most coarse detail level, based on the cost function of the data only. The cost function of the seams is assumed as equal to zero.
Figure 3:
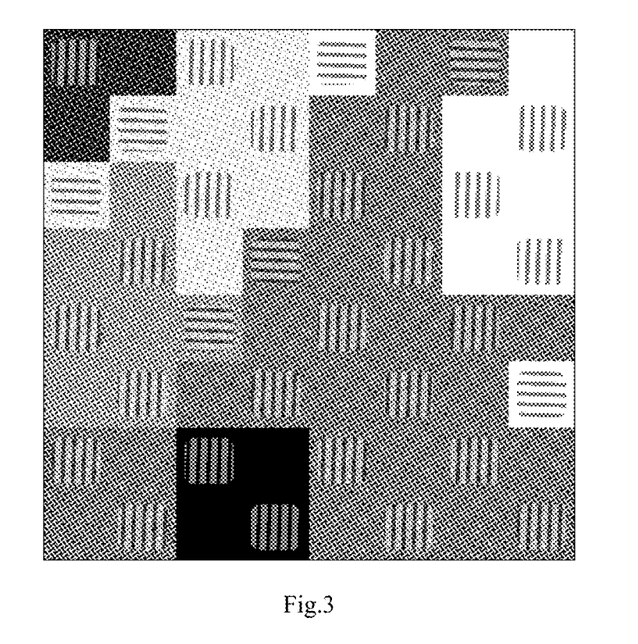
FIG. 3 depicts the segmentation state after the first iteration. Rectangles with rounded tops mark the squares processed on a given iteration. The horizontal shading marks the squares with altered segmentation on a given iteration; the vertical shading—squares where the segmentation was preserved.
Figure 4:
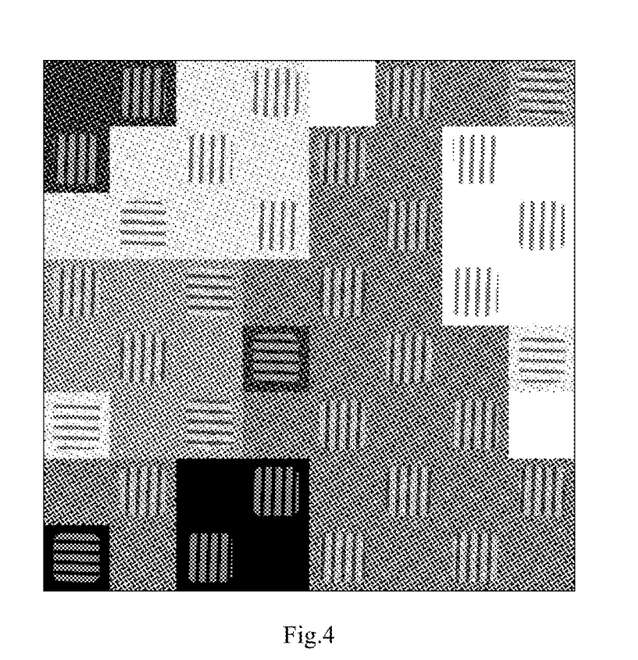
FIG. 4 depicts the segmentation state after the second iteration.
Figure 5:
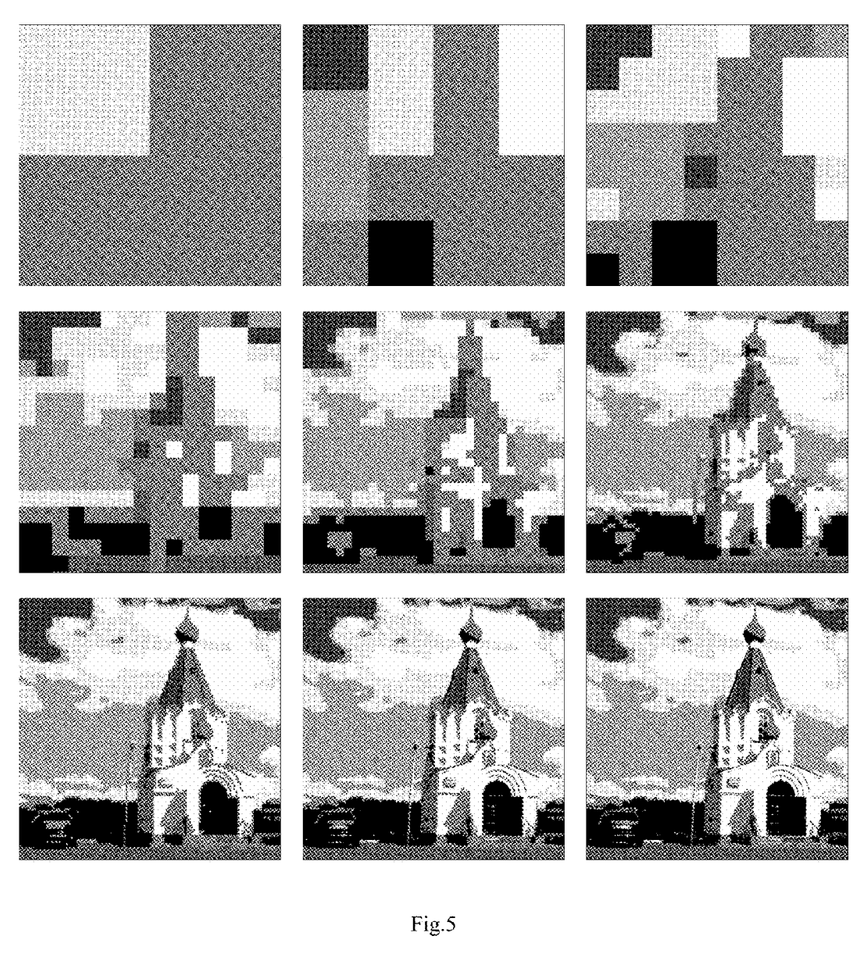
FIG. 5 depicts the final results of segmentation at each of the detail levels. The bottom right corner depicts the resulting segmentation solution.
Figure 6:
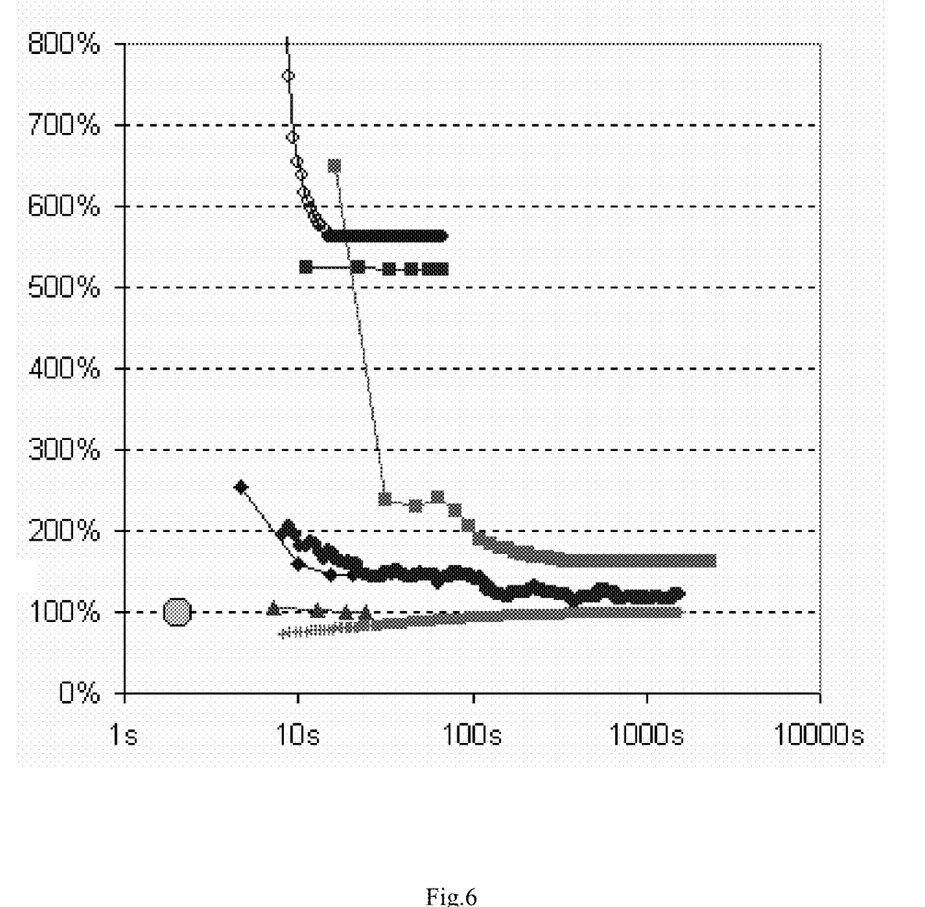
FIG. 6 shows convergence diagrams of various methods—described in the paper by R. Szeliski, R. Zabih, D. Scharstein, O. Veksler, V. Kolmogorov, A. Agarwala, M. Tappen, and C. Rother, "A Comparative Study of Energy Minimization Methods for Markov Random Fields with Smoothness-based Priors", *IEEE Transactions on Pattern Analysis and Machine Intelligence*, vol. 30, no. 6, June 2008—to achieve the global minimum on a task of panorama stitching. The vertical axis is the deviation from the global minimum, in %; the horizontal axis is the logarithmic time axis, in seconds. The diagrams display.
Figure 7:
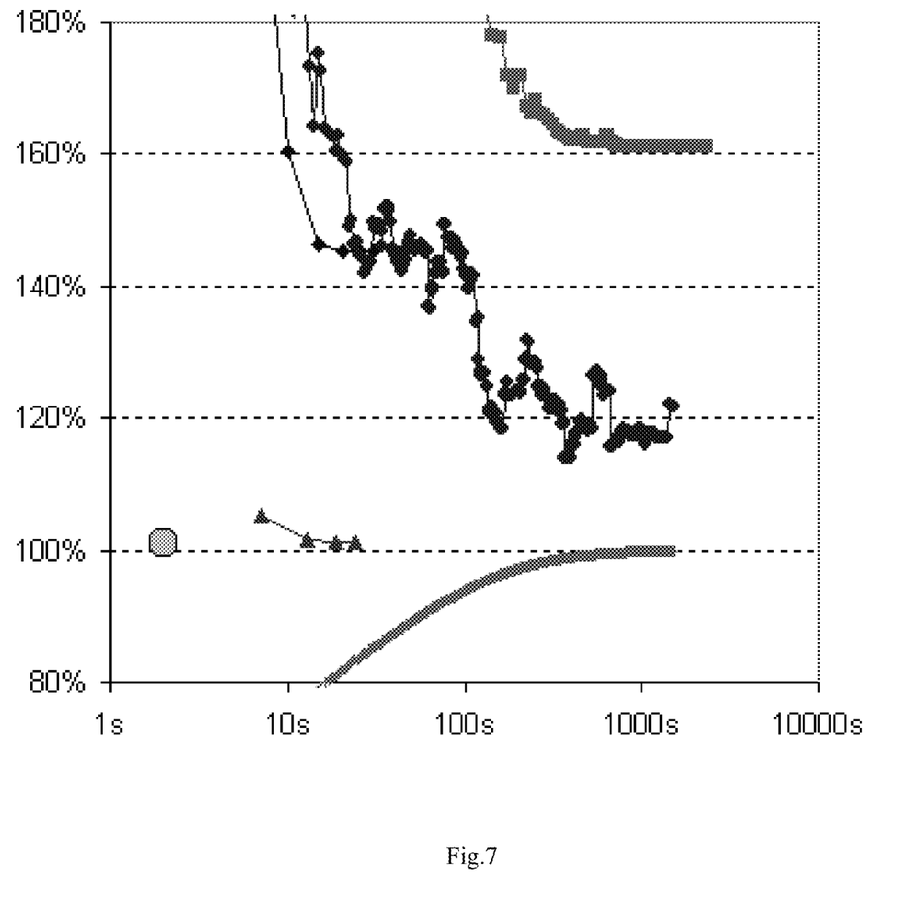
FIG. 7 and FIG. 8 depict enlarged diagram versions of FIG. 6 with an enlarged scale of deviation from the global minimum.
Figure 8:
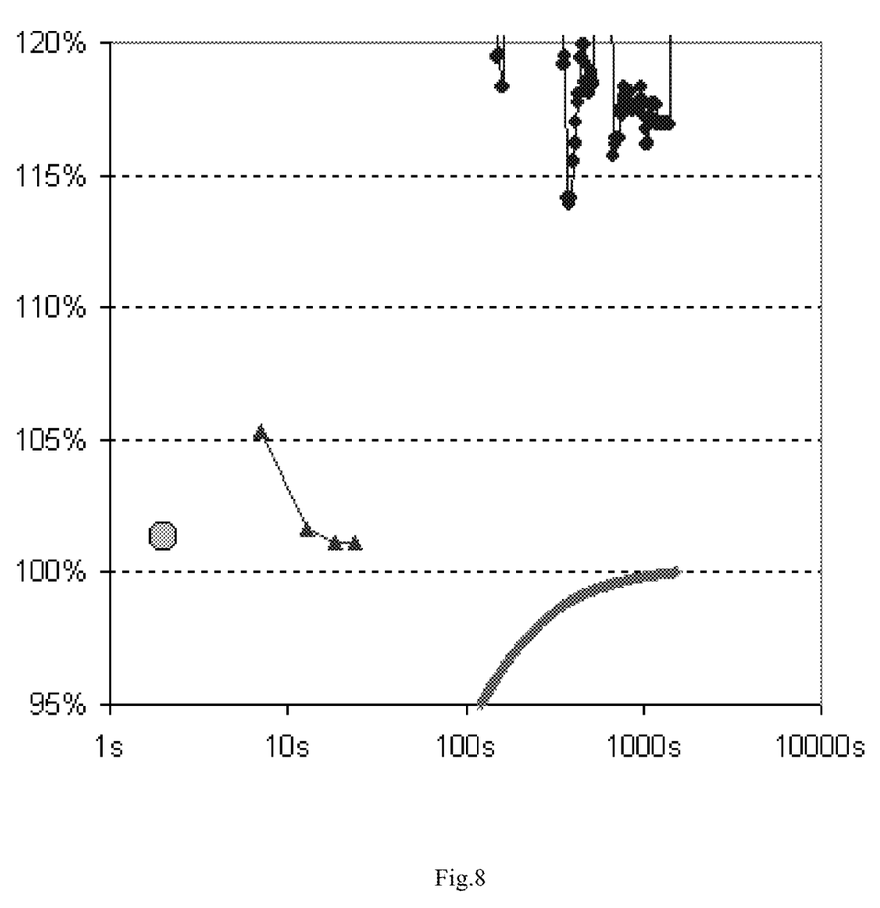

Even and uneven iterations are performed in a staggered order. With this order, the result of processing on a separate iteration does not depend on the direction of the seam trajectory. Thus, each seam (on the side of a square) is affected only by one square and not by any other neighboring squares from a given iteration.

For the purpose of excluding unpractically long segment boundaries, the absolute difference of numeric color values of adjacent pixels plus a certain positive constant is used as the cost function of a seam for a specific pixel. In this case, the constant increases the value of the cost function of a seam as its total length increases.

To avoid a trap in the search for the global minimum in one of the local minimums, the first three iterations at each detail level are executed with a reduced cost of the seam function with coefficient of 0.6, 0.75, and 0.9, respectively.

The processing speed can be further increased by means of saving a current approximation to the optimal segmentation and the segmentation conditioned only by the cost functions of the data on each iteration. The size of this data is equal to a doubled number of image pixels. Additional memory is necessary only for storage of reference data needed for calculating the cost functions of the data and seams, or, if required, for pre-calculated values of given functions since they are constant for each pixel throughout the processing.

INDUSTRIAL APPLICABILITY

The presented method has the following merits as compared to currently existing analogs:
1. Operating speed. The total processing time in current widespread mobile devices (year of release 2011)—within one second.
2. Segmentation quality (closeness to the absolute/optimal segmentation) is analogous to the best known methods.
3. Very low requirements for memory resources when the method is implemented.
4. The method is resistant to image noises due to the absence of a trap in local minimums.

What is claimed is:
1. The image segmentation method comprising of search for an optimum of the cost functions, wherein:
   the search is carried out at an N-number of image detail levels, from coarser to finer;
   at each image detail level the image is divided (segmented) into regions;
   each region is assigned a single segmentation value by means of an n-number of successive iterations;
   at each iteration the value of the cost function for the seams at the region boundaries is calculated for different versions of image segmentation;
   for every region a segmentation value is chosen which optimizes the combination of the cost functions of the seams and data.
2. A method according to claim 1, wherein the search for an optimum at each iteration is executed through processing of the image regions which do not have common boundaries, and the choice of regions for processing is changed for each iteration.
3. The method according to claim 1, wherein the input of the cost function of seams into the combination of the cost functions of the data and seams is reduced in subset of the iterations.
4. The method according to claim 1, wherein optimum of the cost functions is searched as minimum of cost functions.
5. The method according to claim 1, wherein combination of cost functions of the seams and data is arithmetic summation.

* * * * *